(12) United States Patent
Yano et al.

(10) Patent No.: US 7,417,080 B2
(45) Date of Patent: Aug. 26, 2008

(54) OIL-BASED INK COMPOSITION AND WRITING INSTRUMENT USING THE SAME

(75) Inventors: Masanao Yano, Fujioka (JP); Yoshihito Fujiwara, Fujioka (JP); Tadashi Koriki, Fujioka (JP); Yuji Omori, Fujioka (JP); Naoto Yokokawa, Fujioka (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 692 days.

(21) Appl. No.: 11/008,391

(22) Filed: Dec. 10, 2004

(65) Prior Publication Data

US 2005/0137285 A1  Jun. 23, 2005

(30) Foreign Application Priority Data

Dec. 18, 2003  (JP)  ............................. 2003-421000

(51) Int. Cl.
*C09D 11/00* (2006.01)

(52) U.S. Cl. ...................................... 523/160; 523/161

(58) Field of Classification Search ................ 523/160, 523/161

See application file for complete search history.

(56) References Cited

U.S. PATENT DOCUMENTS

| | | | | |
|---|---|---|---|---|
| 5,249,875 A | * | 10/1993 | Hori et al. | ................... 401/148 |
| 6,659,672 B1 | * | 12/2003 | Kirita | ........................ 401/199 |
| 6,786,956 B2 | * | 9/2004 | Ichikawa | ................. 106/31.43 |
| 6,887,008 B2 | * | 5/2005 | Kitao et al. | ................. 401/219 |
| 7,037,019 B2 | * | 5/2006 | Miyamoto et al. | ........... 401/222 |
| 7,297,730 B2 | * | 11/2007 | Hattori et al. | ............... 523/161 |

FOREIGN PATENT DOCUMENTS

| | | |
|---|---|---|
| JP | 04-139273 A | 5/1992 |
| JP | 06-313140 A | 11/1994 |
| JP | 2002-161227 A | 6/2002 |

* cited by examiner

*Primary Examiner*—Edward J Cain
(74) *Attorney, Agent, or Firm*—Buchanan Ingersoll & Rooney PC (57) ABSTRACT

Provided is an oil-based ink composition comprising at least a colorant, titanium oxide, a solvent including propylene glycol monomethyl ether and ethanol, a polyvinylbutyral resin and a ketone resin.

12 Claims, 6 Drawing Sheets

OIL-BASED INK COMPOSITION AND WRITING INSTRUMENT USING THE SAME

BACKGROUND OF THE INVENTION

1. Field of the Invention

The present invention relates to an oil-based ink composition and a writing instrument using the same. More specifically, the present invention relates to an oil-based ink composition which is excellent in a coating film glossiness (or drawn line glossiness), a drawn line-fixing property, a drawn line-drying property and an aging stability of the ink and a writing instrument using the same.

2. Description of the Prior Art

An oil-based marking pen including a paint marker charged with an oil-based ink composition which can write on ink-non-absorbing faces such as a plastic face, a resin film face, a metal face and the like in addition to paper, and many kinds of the products have so far been known.

Known as an oil-based ink composition used for the above writing instrument is, for example, an oil-based ink composition for a white marking pen prepared by dissolving at least one resin selected from a ketone resin and an alkylphenol resin in at least one organic solvent selected from the group consisting of aliphatic lower alcohol having 1 to 3 carbon atoms and monoether of glycol having 2 or 3 carbon atoms and aliphatic lower alcohol having 1 to 3 carbon atoms and dispersing thereinto at least one additive selected from the group consisting of titanium oxide, fine powder silica and fine powder magnesium carbonate (refer to Japanese Patent Application Laid-Open No. Hei 6-313140 (Claims, Examples and the like) as a prior art).

Further, known are an ink for a writing instrument which is an ink used for free ink type valve writing instrument and comprises at least a volatile solvent, 5 to 30% by weight of a fixing agent and 8 to 20% by weight of a pigment and which has a viscosity of 30 to 2000 mPa·sec at 20° C. (refer to Japanese Patent Application Laid-Open No. 2002-161227 (Claims, Examples and the like) as a prior art) and an oil-based ink comprising at least a colorant, one or plural solvents selected from propylene glycol monomethyl ether, dipropylene glycol monomethyl ether and aliphatic alcohol having 4 or more carbon atoms, a resin having a hydrophilic group and a resin having a hydrophobic group which are soluble in the solvent described above and which are not compatible with each other (refer to Japanese Patent Application Laid-Open No. Hei 4-139273 (Claims, Examples and the like) as a prior art).

However, the oil-based ink compositions described in the three patent documents described above still have the problem that they are inferior in a coating film glossiness and a drawn line-fixing property on an ink-non-absorbing face such as a plastic face, a resin film face and the like. Further, the ink disclosed in Japanese Patent Application Laid-Open No. Hei 6-313140 has the problem that the drawn lines are dent-shaped and are inferior in a drying property, and the inks disclosed in Japanese Patent Application Laid-Open No. 2002-161227 and Japanese Patent Application Laid-Open No. Hei 4-139273 have the problem that titanium oxide having a masking property is not contained, so that vivid and clear drawn lines can not be obtained.

SUMMARY OF THE INVENTION

In light of the problems and the existing situation of the conventional techniques described above, the present invention has been made in order to solve them. According to the oil-based ink composition of the present invention and the writing instrument using the same, vivid and clear lines can be drawn. The present invention has been made for the purpose of providing an oil-based ink composition which is excellent in a coating film glossiness (or drawn line glossiness), a drawn line-fixing property, a drawn line-drying property and an aging stability of the ink and a writing instrument using the same.

Intensive investigations repeated by the present inventors in order to solve the conventional problems described above have resulted in finding that an oil-based ink composition which meets the purpose described above and a writing instrument using the same can be obtained by an ink composition comprising at least a colorant, titanium oxide, a solvent comprising a specific combination, a polyvinylbutyral resin and a ketone resin, and thus they have come to complete the present invention.

That is, the present invention provides an oil-based ink composition and a writing instrument each described in the following items (1) to (6).

(1) An oil-based ink composition comprising at least a colorant, titanium oxide, a solvent comprising propylene glycol monomethyl ether and ethanol, a polyvinylbutyral resin and a ketone resin.

(2) The oil-based ink composition as described in the above item (1), further comprising at least one modified silicone selected from amino-modified silicone, polyether-modified silicone, alkyl-modified silicone, epoxy-modified silicone, carboxyl-modified silicone, carbinol-modified silicone, methacryl-modified silicone, mercapto-modified silicone, phenol-modified silicone, one end reactivity-modified silicone, different functional group-modified silicone, methylstyryl-modified silicone, higher fatty acid ester-modified silicone, higher alkoxy-modified silicone, modified higher fatty acid-containing silicone and fluorine-modified silicone.

(3) The oil-based ink composition as described in the above item (1) or (2), wherein a blending ratio of propylene glycol monomethyl ether to ethanol is 1:0.2 to 1:2.5 in terms of a weight ratio.

(4) The oil-based ink composition as described in any of the above items (1) to (3), wherein 10 to 40% by weight of titanium oxide, 1 to 10% by weight of the polyvinylbutyral resin, 5 to 35% by weight of the ketone resin and 30 to 85% by weight of the solvent each based on the whole amount of the ink composition are contained respectively.

(5) A writing instrument charged with the oil-based ink composition as described in any of the above items (1) to (4).

(6) The writing instrument as described in the above item (5), wherein the writing instrument described above comprises an ink tank for receiving the oil-based ink composition, and a pen feed is installed in an aperture part of the ink tank in the writing instrument main body described above via a valve mechanism.

BRIEF DESCRIPTION OF THE DRAWINGS

In FIG. 1 to FIG. 6, "A" represents a writing instrument; "10" represents a writing instrument main body; "20" represents a valve mechanism; "25" represents a packing member (swelling material); "30" represents a pen feed; "40" represents a front holder; and "50" represents a cap body, respectively.

DESCRIPTION OF THE PREFERRED EMBODIMENTS

The embodiment of the present invention shall be explained below in details.

The oil-based ink composition of the present invention comprises at least a colorant, titanium oxide, a solvent comprising propylene glycol monomethyl ether and ethanol, a polyvinylbutyral resin and a ketone resin.

The colorant used in the present invention shall not specifically be restricted as long as it is a colorant which has so far been used for oil-based inks, and it includes conventionally used pigments and dyes.

Capable of being used as the colorant used in the present invention are, for example, organic pigments such as azo base pigments, condensed polyazo base pigments, phthalocyanine base pigments, metal complex pigments, thioindigo pigments, dye lake pigments and fluorescent pigments and inorganic pigments such as carbon black and the like. Further, processed pigments which are processed on a surface by resin coating, for example, various microlith A types, AS Black, AS Blue and IK Red can also be used as the colorant used in the present invention.

The dye shall not specifically be restricted as long as it is dissolved in propylene glycol monomethyl ether and ethanol. That is, for example, solvent dyes such as alcohol-soluble dyes and spirit-soluble dyes and leuco dyes can be given as the dye used in the present invention.

The above colorants can be used alone or in a mixture of two or more kinds thereof.

A content of the above colorants is preferably 0.05 to 10% by weight (hereinafter referred to merely as %), more preferably 0.1 to 5% by weight in terms of the total based on the whole amount of the ink composition.

If the content of the above colorants is less than 0.05%, the problem that a density of the drawn lines is reduced is caused. On the other hand, if it is more than 10%, the fluidity and a solubility and a storage stability of the dissolved components are deteriorated. Accordingly, the above content ranges are not preferred.

Titanium oxide used in the present invention is used in order to make it possible to write vivid and clear lines having a good masking property on a color-absorbing writing face of a color drawing paper such as a black drawing paper and an ink-non-absorbing face such as a plastic face, a resin film face, a metal face and a glass face.

Titanium oxide which can be used shall not specifically be restricted as long as it is used as a pigment for an oil-based ink.

To be specific, it includes Cronos KR-270, ditto KR-310 and KR-380 (all manufactured by Titan Kogyo Co., Ltd.), Ti-Pure R-90, ditto R-902 and ditto R-700 (all manufactured by Du Pont Co., Ltd.) and JR-602, JR-701 and JR-800 (all manufactured by Teica Co., Ltd.).

If the oil-based ink composition of the present invention is a white oil-based ink composition, the colorant described above is not contained (that is, the content thereof is 0%), and the above titanium oxide which is a white pigment can be substituted for it.

A content of above titanium oxide is preferably 10 to 40%, more preferably 15 to 30% based on the whole amount of the ink composition.

If a content of titanium oxide contained in the ink composition is less than 10%, the masking rate on a writing face is reduced, and vivid and clear lines can not be drawn by the ink composition. On the other hand, if a content of titanium oxide contained in the ink composition exceeds 40%, the glossiness is reduced, and a flocculation in the ink composition and a deterioration in the ink aging stability are brought about. Accordingly, it is not preferred that a content of titanium oxide falls in the ranges described above.

The solvent used in the present invention comprises propylene glycol monomethyl ether (PGM) and ethanol.

In the present invention, two kinds of the solvents described above are used in combination because of controlling the viscosity, accelerating dissolution of the dye, controlling dispersion of the pigment and the like, controlling a drying property of the ink, inhibiting the ink from blowing from the pen tip and inhibiting the pen tip from drying up.

When only PGM is added to the ink composition, a drying property of the drawn lines is inferior, and when only ethanol is added to the ink composition, the ink blows off by a rise in an internal pressure of the ink tank or the pen tip is dried up when the cap is off. Accordingly, it is not preferred. Also, when other solvents, for example, toluene and xylene which are used for conventional quick-drying marking pens are used, writing on a polyvinyl chloride-made or foamed styrol-made material brings about the problems that a writing face is damaged and that the lines are not dried, and therefore it is not preferred.

A total content of the above solvents is preferably 30 to 85%, more preferably 45 to 70% based on the whole amount of the ink composition.

If a content of the above solvents is less than 30%, the drying property is lowered. On the other hand, if it exceeds 85%, the ink is liable to be blurred on a writing face, and drying-up of the pen tip is liable to be caused. Accordingly, the above content ranges of the solvents are not preferred.

In the present invention, a blending ratio of ethanol to PGM each described above is preferably 0.2 to 2.5: PGM 1, more preferably 0.5 to 1.0: PGM 1 in terms of a weight ratio from the viewpoints of a drying property of the drawn lines, ink blowing inhibition and drying-up of the pen tip.

The polyvinylbutyral resin (PVB resin) used in the present invention is dissolved in the solvents described above, and it is used for elevating a dispersibility of titanium oxide contained in the ink composition, enhancing a strength of the coating film after the ink composition is fixed on an absorbing face and raising the abrasion resistance strength.

The PVB resin which can be used is preferably a resin having an average polymerization degree of 200 to 1000. Capable of being given as the examples of the PVB resin which can be used in the present invention are, for example, Denka Butyral #2000-1, #2000-2, #2000-D, #3000-1, #3000-2, #3000-4, #3000-K, #4000-1, #4000-2 and #5000-S (all manufactured by Denki Kagaku Kogyou Co., Ltd.), S-Rec BL-1, BL-1H, BL-2, BL-3, BL-S, BX-L, BM-1, BM-2, BM-5, BM-S, BH-3, BX-1 and BX-7 (all manufactured by Sekisui Chemical Co., Ltd.). They can be used alone or in a mixture of two or more kinds thereof.

A content of the above PVB resins falls in a range of 1 to 10%, preferably 2 to 8% and more preferably 3 to 6% based on the whole amount of the ink composition.

If a content of the above PVB resins is less than 1%, dispersion of titanium oxide (pigment) becomes instable. On the other hand, if it exceeds 10%, a reduction in the ink flow amount, a reduction in the leveling property and an increase in a viscosity of the whole ink are brought about, and therefore it is not preferred.

The ketone resin used in the present invention is not likely to induce a whitening phenomenon of the ink composition, and therefore it is used for enhancing a fixing property of the ink composition and a glossiness of the coating film.

The ketone resin which can be used shall not specifically be restricted as long as it is a ketone resin dissolved in the solvents described above. Capable of being given as the examples of the ketone resin are Hilac 110H (manufactured by Hitachi Chemical Co., Ltd.), Halon 80 and ditto 110 (all manufactured by Honshu Chemical Co., Ltd.) and Ketone Resin K-90 (manufactured by Arakawa Chemical Industries Ltd.). They can be used alone or in a mixture of two or more kinds thereof.

A content of the above ketone resins falls in a range of 5 to 35%, preferably 5 to 30% and more preferably 10 to 25% based on the whole amount of the ink composition.

If a content of the above ketone resins is less than 5%, a fixing property of the ink composition is reduced. On the other hand, if it exceeds 35%, a viscosity of the whole ink is increased, and therefore it is not preferred.

In the present invention, modified silicone is preferably contained from the viewpoint of further rise in a glossiness of the coating film (drawn line), a fixing property of the drawn lines and a drying property of the drawn lines.

The modified silicone which can be used includes, for example, amino-modified silicone, polyether-modified silicone, alkyl-modified silicone, epoxy-modified silicone, carboxyl-modified silicone, carbinol-modified silicone, methacryl-modified silicone, mercapto-modified silicone, phenol-modified silicone, one end reactivity-modified silicone, different functional group-modified silicone, methylstyryl-modified silicone, higher fatty acid ester-modified silicone, higher alkoxy-modified silicone, modified higher fatty acid-containing silicone and fluorine-modified silicone. They can be used alone or in a mixture of two or more kinds thereof.

Among the above modified silicones, polyether-modified silicone, alkyl-modified silicone and amino-modified silicone are more preferred, and polyether-modified silicone such as polyoxyalkylene-modified polysiloxane is particularly preferred from the viewpoint of further rise in a glossiness of the coating film (drawn line), a fixing property of the drawn lines and a drying property of the drawn lines.

To be specific, they include polyether-modified silicones (polyoxyalkylene-modified polysiloxane) which are commercially available as L-720, FZ-2104 and FZ-2191 (all manufactured by Nippon Unicar Co., Ltd.), KP-316 and KP-316A (all manufactured by Shin-Etsu Silicone Co., Ltd.), TSF4440 and TSF4445 (all manufactured by Toshiba Silicone Co., Ltd.), alkyl-modified silicones which are commercially available as TSF4421 and TSF4422 (all manufactured by Toshiba Silicone Co., Ltd.), TSF4700 and TSF4701 (all manufactured by Toshiba Silicone Co., Ltd.), amino-modified silicones which are commercially available as KP-356 and KP-357 (all manufactured by Shin-Etsu Silicone Co., Ltd.).

A content of the above modified silicones falls in a range of 0.01 to 2%, preferably 0.01 to 1.5% and more preferably 0.02 to 0.08% based on the whole amount of the ink composition.

If a content of the above modified silicones is less than 0.01%, further effect given by addition thereof is not expected. On the other hand, if it exceeds 2%, a sea stripe phenomenon is caused, and the fixing property is reduced, so that it is not preferred.

Optional components (additives) in addition to the respective components described above can be added to the oil-based ink composition of the present invention as long as the effects of the present invention are not damaged. That is, anionic, nonionic and cationic surfactants, a dry preventive, a rust preventive, an anti-mold agent, a precipitation inhibitor and the like can suitably be added, if necessary, as the optional components.

In the present invention, a viscosity of the ink is controlled to preferably 8 to 40 mPa·sec, more preferably 10 to 30 mPa·sec at 25° C.

If the above viscosity is so high as exceeding 40 mPa·sec, the writing feeling becomes heavy, and the pen is less liable to smoothly write. On the other hand, if it is less than 5 mPa·sec, precipitation of the pigment at the pen tip and feathering of the drawn lines on a writing face are liable to be brought about, and therefore it is not preferred.

The oil-based ink composition of the present invention can be produced by applying a conventional known production process for an oil-based ink composition using the respective components described above. That is, the targeted oil-based ink composition can be obtained by mixing titanium oxide, the colorant, the resin, the solvent and the additives by means of a dispersing mixer or a stirrer.

In producing the oil-based ink composition of the present invention, it may be heated in order to dissolve the solid matters such as the dye and the like, and a filter and a centrifugal separator may be used in order to remove the coarse particles of the organic pigment and the like.

In the present invention, the structure of a writing instrument charged with the oil-based ink composition having the structure described above shall not specifically be restricted as long as it can be charged with the oil-based ink composition of the present invention and can write so that the effects of the present invention can be exhibited.

It includes preferably a writing instrument equipped with a pen feed (pen tip) via a valve mechanism at an ink tank aperture part in a writing instrument main body having an ink tank for storing an oil-based ink composition.

To be specific, it includes the writing instruments of the respective embodiments shown in FIG. 1 to FIG. 6.

Figure 1:
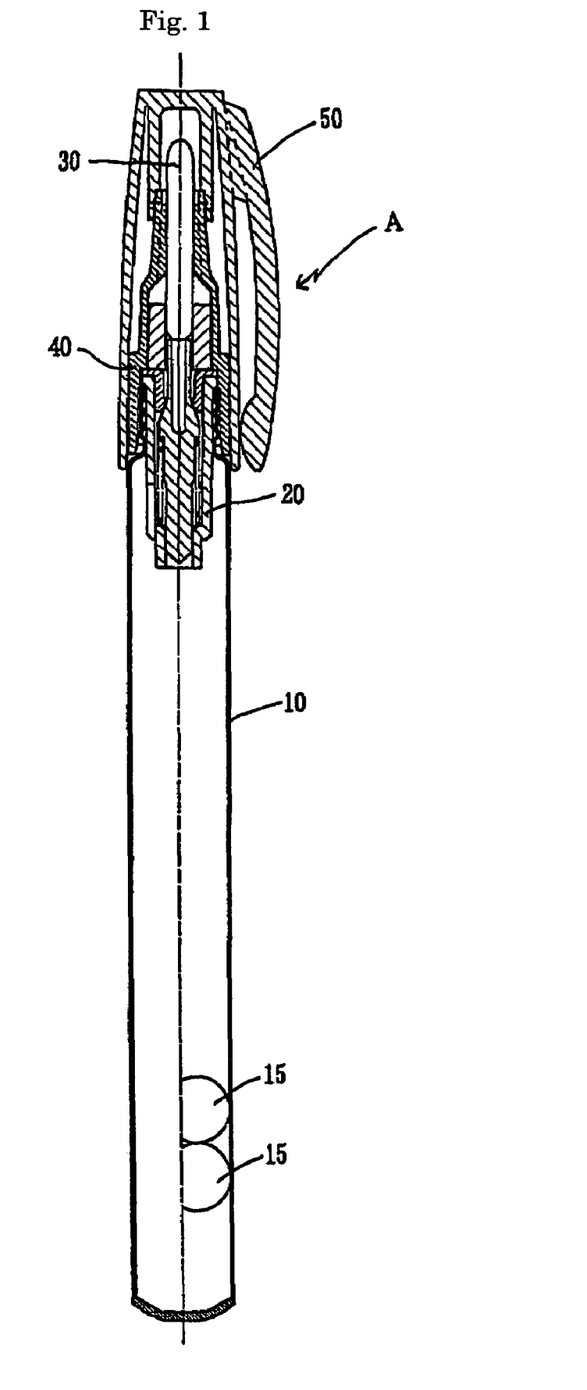
FIG. 1 is a partial vertical cross-sectional drawing showing the writing instrument of the first embodiment charged with the oil-based ink composition of the present invention.
Figure 2:
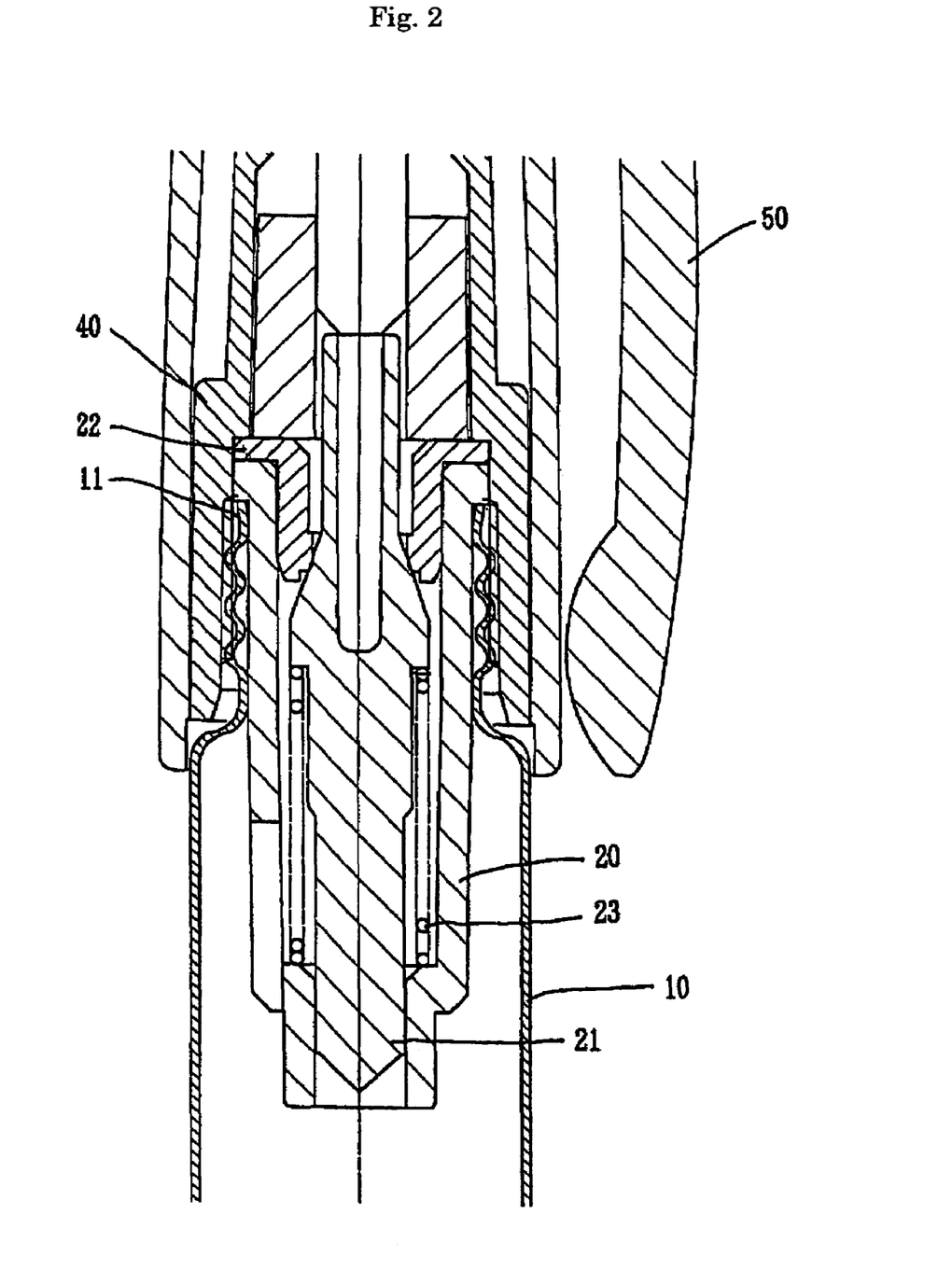
FIG. 2 is a partial vertical cross-sectional drawing showing an essential part in FIG. 1.

The writing instrument showing the first embodiment of the present invention is shown in FIG. 1 and FIG. 2. The writing instrument "A" of the above first embodiment is equipped with a writing instrument main body "10" which is also used as an ink tank for storing the oil-based ink composition having the structure described above and a pen feed "30" comprising a fiber bundle feed or a sintered body which is a pen tip via a valve mechanism "20" at an aperture part "11" of the above ink tank "10" in a front holder "40", wherein "15" is a stirring ball, and "50" is a cap body. The valve mechanism "20" is constituted from a valve rod "21", a valve seat "22" and a spring member "23" for pressing the valve rod "21" described above toward a valve seat "22" direction to allow the above valve mechanism "20" to stay in a closed state.

In writing, the pen feed "30" is pressed toward a writing face to open the valve mechanism "20", and the oil-based ink composition is impregnated into the pen feed "30" from the ink tank "10" to make it possible to write.

Figure 3:
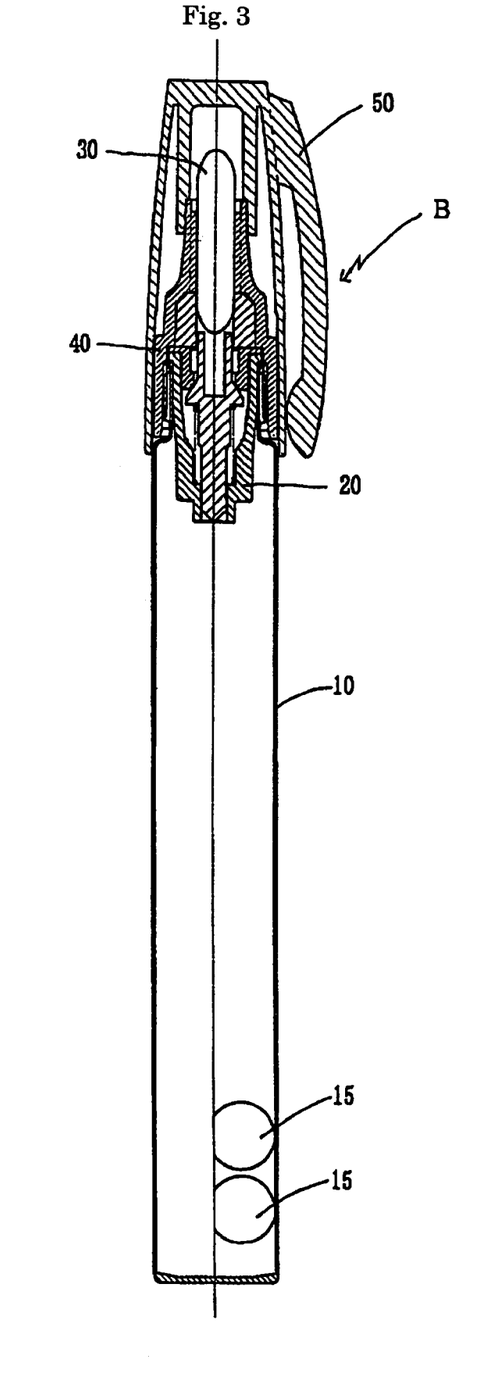
FIG. 3 is a partial vertical cross-sectional drawing showing the writing instrument of the second embodiment charged with the oil-based ink composition of the present invention.
Figure 4:
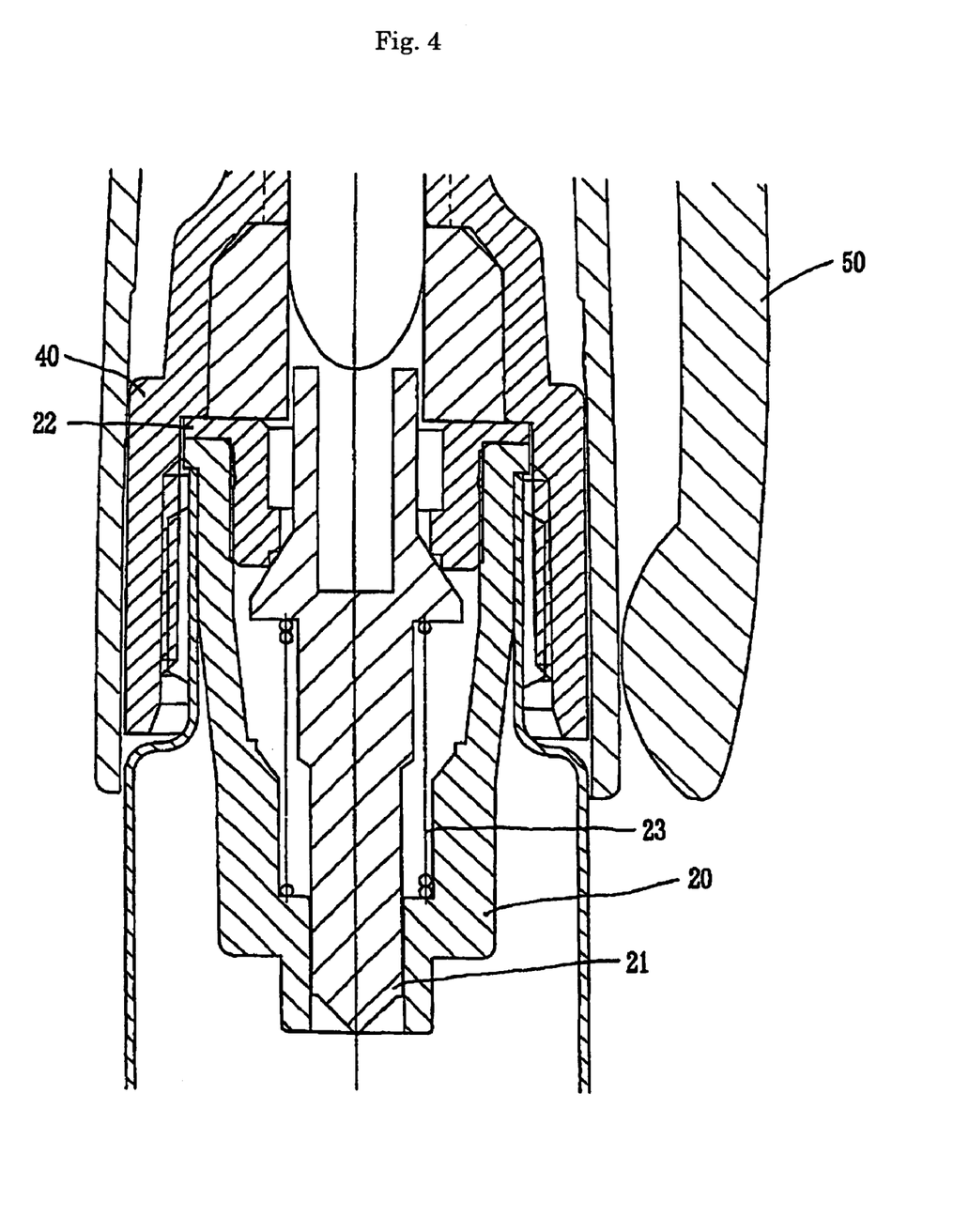
FIG. 4 is a partial vertical cross-sectional drawing showing an essential part in FIG. 3.

The writing instrument showing the second embodiment of the present invention is shown in FIG. 3 and FIG. 4. Parts having the same structure and action as those of the writing instrument "A" of the first embodiment are affixed with the same codes, and the explanations thereof shall be omitted (the same shall apply to the following embodiments).

The writing instrument "B" of the above second embodiment is different from the writing instrument "A" of the first embodiment described above only in the point that a targeted thickness of the drawn lines is different, and it is used in the same manner as in the writing instrument "A".

Figure 5:
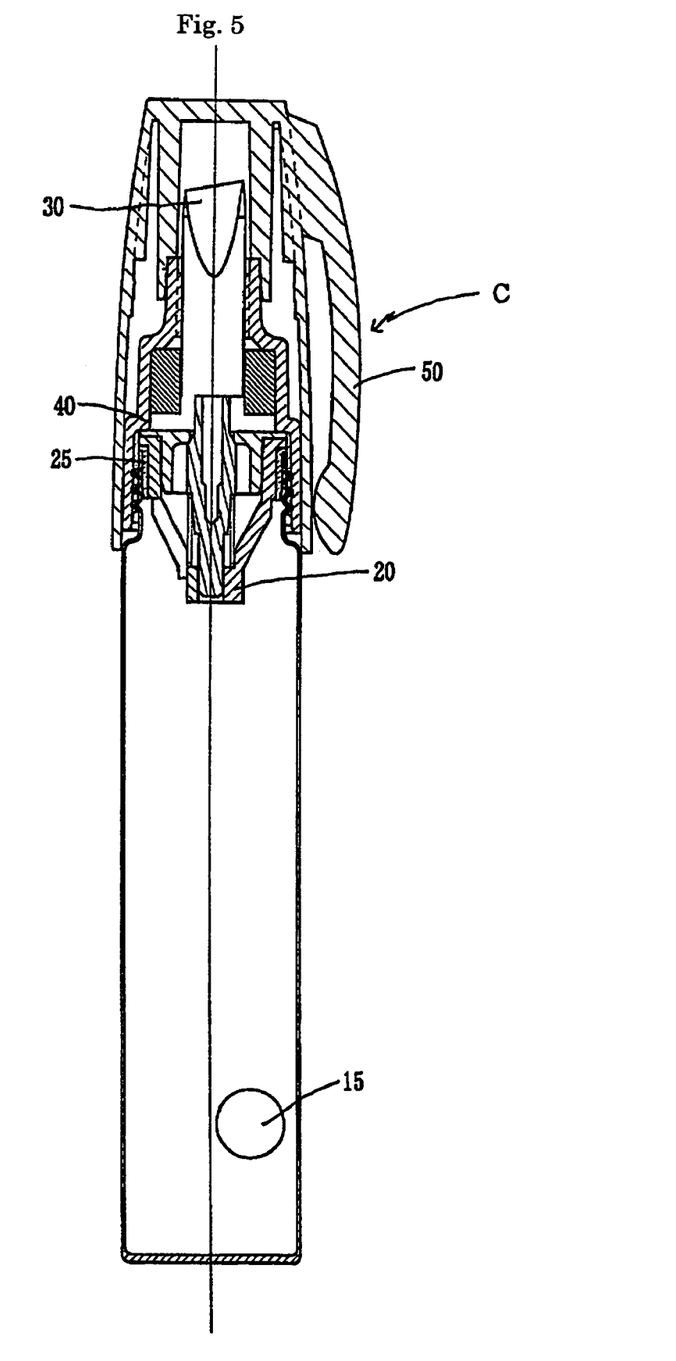
FIG. 5 is a partial vertical cross-sectional drawing showing the writing instrument of the third embodiment charged with the oil-based ink composition of the present invention.
Figure 6:
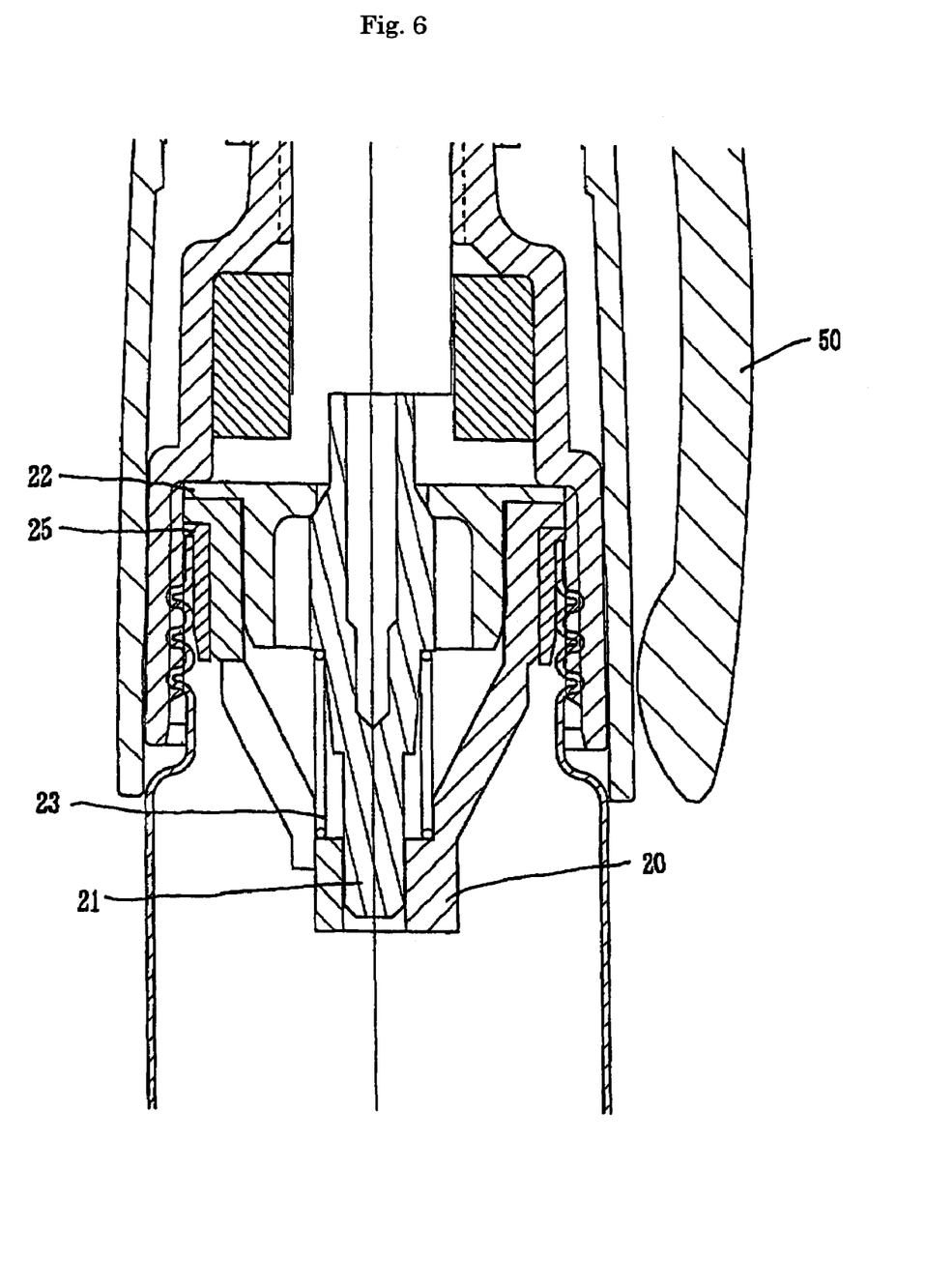
FIG. 6 is a partial vertical cross-sectional drawing showing an essential part in FIG. 5.

The writing instrument showing the third embodiment of the present invention is shown in FIG. 5 and FIG. 6. The writing instrument "C" of the above third embodiment is equipped with a packing member comprising a material which is swollen by an oil-based ink or a solvent, for example, at least one of a polyethylene member, a nylon member and a thermoplastic elastomer at a combining part of a writing instrument main body "10" and a valve mechanism "20". It is different from the writing instrument "A" of the first embodiment described above only in the point that an air tightness at the above combining part is raised by swelling of the above swelling material to prevent the oil-based ink composition having a volatility from leaking from the above part, whereby an excellent sealing effect can be exhibited. It is used in the same manner as in the writing instrument "A".

The oil-based ink composition of the present invention thus constituted comprises the colorant, titanium oxide, the solvent comprising propylene glycol monomethyl ether and ethanol, the polyvinylbutyral resin, the ketone resin and modified silicone and therefore can write well on any kind of an ink non-absorbing face such as a glass face and a plastic film face as well as paper, and vivid and clear lines can be drawn. Further, it is excellent in a coating film glossiness (or drawn line glossiness), a drawn line-fixing property, a drawn line-drying property and an aging stability of the ink.

Further, a writing instrument charged with the oil-based ink composition having the excellent effects described above is provided in the present invention.

Next, the present invention shall be explained in details with reference to examples and comparative examples, but the present invention shall not be restricted to the following examples.

EXAMPLES 1 TO 6 AND COMPARATIVE EXAMPLES 1 TO 7

Blend compositions shown in the following Table 1 were dispersed by means of a bead mill to prepare the respective oil-based ink compositions.

The respective oil-based ink compositions thus obtained were measured for a viscosity at 25° C. by means of a corn plate type viscometer (TV-20 type, manufactured by Tokimec Inc.).

Further, the respective oil-based ink compositions were charged into an ink tank of the writing instrument which had the following structure and was shown in FIG. 3 and FIG. 4 to evaluate a coating film glossiness (or drawn line glossiness), a fixing property, a drying property (when drawn on PET film or glass plate) and an ink blow-inhibiting property by the following respective evaluating methods. Also, an aging stability of the ink was evaluated by the following evaluating method.

The results thereof are shown in Table 1 and Table 2.

Structure of the Writing Instrument:
The writing instrument shown in FIG. 3 and FIG. 4 was used.

Ink tank capacity: 6.5 ml

Pen tip structure: acryl fiber feed having a diameter of 5 mm

Evaluating Method of Coating Film Glossiness:
The writing instrument having the structure described above was used for writing on a PET film on the condition of 25° C. and a humidity of 65% to evaluate a written coating film (drawn line) by means of a digital glossiness meter (manufactured by Suga Test Instruments Co., Ltd.) according to the following evaluation criteria. It is shown that the higher the numerical value of the glossiness, the more excellent the coating film glossiness.

Evaluation Criteria:
  ◎: 90 or more
  ○: 80 or more and less than 90
  Δ: 70 or more and less than 80
  x: less than 70

Evaluating Method of Fixing Property:
The writing instrument having the structure described above was used for writing on a PET film on the condition of 25° C. and a humidity of 65%, and after the drawn lines were completely dried one hour later, the PET film was immersed in a water bath storing ware for 24 hours. Then, it was pulled up to evaluate peeling of drawn lines by a rubbing test with an applicator according to the following evaluation criteria.

Evaluation Criteria:
  ◎: drawn lines could be read after immersing, and drawn lines were not peeled even after rubbing test
  ○: drawn lines could be read after immersing, but drawn lines were peeled by rubbing test
  Δ: drawn lines could not be partially read after immersing, and drawn lines were peeled by rubbing test
  x: drawn lines were peeled by rubbing test with an applicator before immersing Evaluating Method of Drying Property:
Straight lines (length 25 cm) were written on a writing material of a PET film and a glass plate (thickness 5 mm) on the condition of 25° C. and a humidity of 40%, and paper and a weight of 500 g were put on the drawn lines at every prescribed time to measure time (seconds) when transferring was not caused. It is shown that the shorter the time, the more excellent the drying property.

Evaluating Method of Ink-Blowing Property:
The pen tip was sufficiently filled with the ink on the condition of 25° C. and a humidity of 65%, and then an amount of the ink discharged from the pen tip in pumping 100 times was measured to evaluate the ink-blowing property according to the following evaluation criteria. It is shown that the less the ink amount, the more excellent the ink blow-inhibiting property.

Evaluation Criteria:
  ◎: less than 0.5 g
  ○: 0.5 g or more and less than 1.0 g
  Δ: 1.0 g or more and less than 2.0 g
  x: 2.0 g or more Evaluating Method of Aging Stability of the Ink:
A glass bottle was charged with each oil-based ink composition and covered with a cap, and the state of the ink after left standing for one month on the condition of 50° C. was evaluated according to the following evaluation criteria.

Evaluation Criteria:
◎: both of viscosity and glossiness of the coating film were good
○: viscosity was stable, but glossiness was reduced
Δ: viscosity was stable to some extent, but glossiness was reduced
x: both of viscosity and glossiness were reduced

TABLE 1

(Unit of Blending: weight %, total 100 wt %)

| | Example | | | | | | | |
|---|---|---|---|---|---|---|---|---|
| | 1 | 2 | 3 | 4 | 5 | 6 | 7 | 8 |
| Colorant (drawn line color) | green | green | yellow | yellow | blue | blue | white | white |
| Valifast Blue 1603*1 | 0.3 | 0.3 | — | — | 0.5 | 0.5 | — | — |
| Valifast Yellow 1101*2 | 0.7 | 0.7 | 1.0 | 1.0 | — | — | — | — |
| Titanium oxide*3 | 25.0 | 25.0 | 25.0 | 25.0 | 20.0 | 20.0 | 20.0 | 20.0 |
| Solvent: | | | | | | | | |
| PGM | 40 | 39.98 | 40 | 39.98 | 32.75 | 27.74 | 33.0 | 32.99 |
| Ethanol | 20 | 19.97 | 20 | 19.97 | 32.75 | 27.73 | 33.0 | 32.98 |
| Blending ratio (PGM:ethanol) | 2:1 | about 2:1 | 2:1 | about 2:1 | 1:1 | about 1:1 | 1:1 | about 1:1 |
| Resin: | | | | | | | | |
| Polyvinylbutyral resin*4 | 6.0 | 6.0 | 5.0 | 5.0 | 5.0 | 15.0 | 4.0 | 4.0 |
| Ketone resin*5 | 8.0 | 8.0 | 9.0 | 9.0 | 9.0 | 9.0 | 10.0 | 10.0 |
| Modified silicon*6 | — | 0.05- | — | 0.05- | — | 0.03 | — | 0.03 |
| Viscosity at 25° C. (mPa·sec) | 35 | 35 | 28 | 28 | 24 | 24 | 16 | 16 |
| Evaluation: | | | | | | | | |
| Coating film glossiness | ◎ | ◎ | ◎ | ◎ | ◎ | ◎ | ◎ | ◎ |
| Fixing property | ◎ | ◎ | ◎ | ◎ | ◎ | ◎ | ◎ | ◎ |
| Drying: PET film (sec) | 50 | 40 | 40 | 30 | 40 | 30 | 40 | 20 |
| property glass plate (sec) | 60 | 50 | 50 | 40 | 50 | 40 | 40 | 30 |
| Ink blow inhibition | ◎ | ◎ | ◎ | ◎ | ◎ | ◎ | ◎ | ◎ |
| Ink aging stability | ◎ | ◎ | ◎ | ◎ | ◎ | ◎ | ◎ | ◎ |

TABLE 2

(Unit of Blending: weight %, total 100 wt %)

| | Comparative Example | | | | | | |
|---|---|---|---|---|---|---|---|
| | 1 | 2 | 3 | 4 | 5 | 6 | 7 |
| Colorant (drawn line color) | yellow | yellow | blue | blue | white | white | white |
| Valifast Blue 1603*1 | — | — | 0.5 | 0.5 | — | — | — |
| Valifast Yellow 1101*2 | 1.0 | 1.0 | — | — | — | — | — |
| Titanium oxide*3 | 20.0 | 20.0 | 20.0 | 20.0 | 20.00 | 20.00 | 20.00 |
| Solvent: | | | | | | | |
| PGM | 31.99 | 33.49 | 65.47 | — | 33.0 | 33.0 | 33.0 |
| Ethanol | 31.98 | 33.48 | — | 65.47 | 33.0 | 33.0 | — |
| n-Propyl alcohol | — | — | — | — | — | — | 33.0 |
| Blending ratio (PGM:ethanol) | about 1:1 | about 1:1 | 1:0 | 0:1 | 1:1 | 1:1 | — |
| Resin: | | | | | | | |
| Polyvinylbutyral resin*4 | — | 12.0 | 4.0 | 4.0 | 4.0 | — | 4.0 |
| Ketone resin*5 | 15.0 | — | 10.0 | 10.0 | — | 10.0 | 10.0 |
| Acryl resin*7 | — | — | — | — | — | 4.0 | — |
| Alkylphenol resin*8 | — | — | — | — | 10.0 | — | — |
| Modified silicone*6 | 0.03 | 0.03 | 0.03 | 0.03 | — | — | — |
| Viscosity at 25° C. (mPa·sec) | 10 | 48 | 19 | 10 | 9 | 17 | 17 |
| Evaluation: | | | | | | | |
| Coating film glossiness | Δ | x | ○ | ◎ | Δ | Δ | Δ |
| Fixing property | Δ | Δ | ◎ | ◎ | x | Δ | ○ |
| Drying: PET film (sec) | 60 | 30 | 120 | 20 | 40 | 30 | 80 |
| property glass plate (sec) | 70 | 40# | 150 | 25 | 50 | 40 | 90 |
| Ink blow inhibition | Δ | ◎ | ◎ | x | ○ | ◎ | ◎ |
| Ink aging stability | ○ | x | ◎ | ◎ | x | ◎ | ○ |

COMPARATIVE EXAMPLE 2

40# (Write Starving Observed)

Remarks *1 to *8 in Table 1 and Table 2 described above are shown below:
*1: manufactured by Orient Chemical Industries, Ltd.
*2: manufactured by Orient Chemical Industries, Ltd.
*3: Ti-Pure R-900, manufactured by Du Pont Co., Ltd.
*4: polyvinylbutyral having an average polymerization degree of 450 (BL-2, manufactured by Sekisui Chemical Co., Ltd.
*5: Ketone Resin K-90 (manufactured by Arakawa Chemical Industries Ltd.
*6: polyether-modified silicone (L-720, polyoxyalkylene-modified silicone, manufactured by Nippon Unicar Co., Ltd.)
*7: Joncryl 61, manufactured by Johnson Polymer Corp.
*8: Hitatol 1500, manufactured by Hitachi Chemical Co., Ltd.)

As apparent from the results shown in Table 1 and Table 2 described above, it has become clear that the oil-based ink compositions prepared in Examples 1 to 8 falling in the scope of the present invention are excellent in all of a coating film glossiness (or drawn line glossiness), a fixing property, a drying property (when drawn on PET film or glass plate), an ink blow-inhibiting property and an ink aging stability as compared with those of the ink compositions prepared in Comparative Examples 1 to 7 falling outside the scope of the present invention.

It has become clear that particularly the ink compositions containing polyether-modified silicone are more excellent in a drying property (when drawn on PET film or glass plate).

In contrast with this, Comparative Example 1 is a case where the polyvinylbutyral resin is not added; Comparative Example 2 is a case where the ketone resin is not added; Comparative Example 3 and Comparative Example 4 are a case where propylene glycol monomethyl ether is added alone and a case where methanol is added alone, respectively; Comparative Example 5 is a case where the alkylphenol resin is used as the resin; Comparative Example 6 is a case where the acryl resin is used as the resin; and Comparative Example 7 is a case where n-propyl alcohol is used as the solvent. It has become clear that in the above cases, inferior is at least one of the coating film glossiness (or drawn line glossiness), the fixing property, the drying property (when drawn on PET film or glass plate), the ink blow-inhibiting property and the ink aging stability and that the effects of the present invention can not be exhibited.

What is claimed is:

1. An oil-based ink composition comprising at least a colorant, titanium oxide, a solvent comprising propylene glycol monomethyl ether and ethanol, a polyvinylbutyral resin, a ketone resin and at least one modified silicone selected from amino-modified silicone, polyether-modified silicone, alkyl-modified silicone, epoxy-modified silicone, carboxyl-modified silicone, carbinol-modified silicone, methacryl-modified silicone, mercapto-modified silicone, phenol-modified silicone, one end reactivity-modified silicone, different functional group-modified silicone, methylstyryl-modified silicone, higher fatty acid ester-modified silicone, higher alkoxy-modified silicone, modified higher fatty acid-containing silicone and fluorine-modified silicone.

2. The oil-based ink composition according to claim 1, wherein a blending ratio of propylene glycol monomethyl ether to ethanol is 1:0.2 to 1:2.5 in terms of a weight ratio.

3. The oil-based ink composition according to claim 1, wherein 10 to 40% by weight of titanium oxide, 1 to 10% by weight of the polyvinylbutyral resin, 5 to 35% by weight of the ketone resin and 30 to 85% by weight of the solvent each based on the whole amount of the ink composition are contained respectively.

4. The oil-based ink composition according to claim 1, wherein 10 to 40% by weight of titanium oxide, 1 to 10% by weight of the polyvinylbutyral resin, 5 to 35% by weight of the ketone resin and 30 to 85% by weight of the solvent each based on the whole amount of the ink composition are contained respectively.

5. A writing instrument charged with the oil-based ink composition according to claim 1.

6. A writing instrument charged with the oil-based ink composition according to claim 1.

7. A writing instrument charged with the oil-based ink composition according to claim 3.

8. A writing instrument charged with the oil-based ink composition according to claim 4.

9. The writing instrument according to claim 5, wherein the writing instrument comprises an ink tank for receiving the oil-based ink composition, and a pen feed is installed in an aperture part of the ink tank in the writing instrument main body via a valve mechanism.

10. The writing instrument according to claim 6, wherein the writing instrument comprises an ink tank for receiving the oil-based ink composition, and a pen feed is installed in an aperture part of the ink tank in the writing instrument main body via a valve mechanism.

11. The writing instrument according to claim 7, wherein the writing instrument comprises an ink tank for receiving the oil-based ink composition, and a pen feed is installed in an aperture part of the ink tank in the writing instrument main body via a valve mechanism.

12. The writing instrument according to claim 8, wherein the writing instrument comprises an ink tank for receiving the oil-based ink composition, and a pen feed is installed in an aperture part of the ink tank in the writing instrument main body via a valve mechanism.

* * * * *